United States Patent [19]

Okada

[11] 4,422,589

[45] Dec. 27, 1983

[54] FRICTION TRANSMITTING APPARATUS

[75] Inventor: Hitoshi Okada, Toda, Japan

[73] Assignee: Clarion Co., Ltd., Tokyo, Japan

[21] Appl. No.: 306,566

[22] Filed: Sep. 28, 1981

[30] Foreign Application Priority Data

Sep. 30, 1980 [JP] Japan .................................. 55-138831

[51] Int. Cl.³ ...................... B65H 17/02; H02K 49/10
[52] U.S. Cl. ................................. 242/68.1; 242/68.3; 310/103
[58] Field of Search ........... 242/68.1, 68.3, 129.5 MC; 192/84 PM; 464/29; 235/104; 310/103, 104

[56] References Cited

U.S. PATENT DOCUMENTS

| | | | |
|---|---|---|---|
| 2,437,997 | 3/1948 | Charlin | 242/68.3 |
| 3,092,984 | 6/1963 | Kramer et al. | 464/29 |
| 3,183,385 | 5/1965 | Gabriel | 310/103 |
| 3,467,821 | 9/1969 | Arp | 235/104 X |
| 4,327,301 | 4/1982 | Janson | 242/68.3 X |
| 4,343,441 | 8/1982 | Graham | 242/68.3 X |

Primary Examiner—Stuart S. Levy
Assistant Examiner—Lloyd D. Doigan
Attorney, Agent, or Firm—Flynn, Thiel, Boutell & Tanis

[57] ABSTRACT

In an apparatus in which there is provided a driving pulley around a rotatable shaft which constructs a driven member in a manner freely rotatable with an external force so that the rotational force of the driving pulley is transmitted to the driven member due to the friciton, a friction transmitting apparatus characterized in that there are further provided a magnetized member mounted on the driving pulley and a magnet mounted around the driven rotatable shaft so that the magnet attracts the magnetized member to thereby transmit the rotational force of the driving pulley to the driven member.

1 Claim, 3 Drawing Figures

FRICTION TRANSMITTING APPARATUS

BACKGROUND OF THE INVENTION

1. Field of the Invention

This invention is directed to reducing the thickness of a friction transmitting apparatus for use in a magnetic recording/reproducing apparatus.

2. Description of the Prior Art

FIG. 1 shows a structure of a conventional friction transmitting apparatus for use in a magnetic recording/reproducing apparatus. The reference numeral 1 designates a driven member integrally formed on a rotatable shaft such as a reel, 2 a driving pulley provided around the driving shaft 1 for being freely rotated by an external energy source, i.e., a motor (not shown), for example, through a belt. Further, the reference numeral 3 denotes solid pad provided between the driven member 1 and the driving pulley 2, 4 a reel driving hub, 5 a spring, 6 a magnetic detecting element and 7 a magnet secured to a flange of the driven member 1.

With this arrangement, the driving pulley 2 is pressed toward the driven member through the solid pad 3 by means of the spring 5. Thus, when the driving pulley 2 rotates with an external force, the rotation is transmitted to the driven member 1 due to the friction of the solid wool 3. In this case, whether the driven member 1 is actually rotating or not can be noted by detecting the action of the magnet 7 by the magnet detecting element 6.

However, in such a conventional structure, since the magnet 7 for magnetically detecting the presence or absence of rotation of the driven member 1 is fixed on the reverse side of the flange of the driven member 1, a respectively large thickness of the whole apparatus has been required, thus holding a drawback in view of size.

OBJECT OF THE INVENTION

It is therefore an object of the present invention to provide a friction transmitting apparatus having a structure without a flange of a driven member on which a magnet for detecting rotation has been secured.

SUMMARY OF THE INVENTION

In accordance with the present invention, there is provided a friction transmitting apparatus for use in a magnetic recording/reproducing apparatus which comprises:

a driving pulley provided in the magnetic recording/reproducing apparatus;
a magnetized member provided on said pulley;
a rotatable shaft; and
a magnet secured to said rotatable shaft for attracting said magnetized member to thereby transmit the rotational force applied to said pulley to said rotatable shaft.

DETAILED DESCRIPTION OF THE PREFERRED EMBODIMENTS

The present invention will now be described in detail referring to the preferred embodiments.

Figure 1:
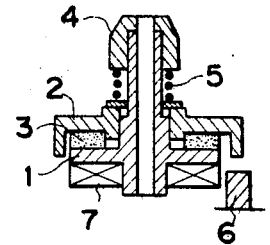
FIG. 1 shows a sectional view of a conventional apparatus.
Figure 2:
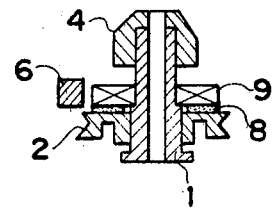
FIG. 2 and FIG. 3 each shows a sectional view illustrating an embodiment according to the present invention.

FIG. 2 shows a sectional view of a friction transmitting apparatus according to the present invention in which same members as those in FIG. 1 are denoted by same reference numerals. The reference numeral 8 designates a magnetized member such as an iron chip secured on a surface of the driving pulley 2 and 9 is a magnet secured around the driven rotatable shaft 1 in a manner opposite to the magnetized member 8.

With this arrangement, since the magnet attracts the magnetized member 8, rotational force produced by the rotation of the driving pulley 2 with an external force is transmitted to the driven member 1 by means of the attracting force of the magnet 9.

Further, the magnet 9 itself can be used as an acting member against the magnet detecting element 6, and thus, it is possible to know if the driven member is actually rotating or not by detecting the action of the magnet 9.

Figure 3:
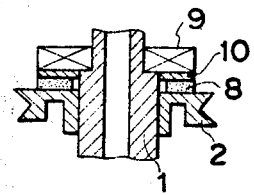

FIG. 3 shows another embodiment according to the present invention. This embodiment is characterized in a structure interposing a slider 10 made of a polymeric material between the magnet 9 and the magnetized member 8 in order to keep a better lubrication.

The structure of the latter embodiment not only can be adopted in a friction portion of a reel base of a tape recorder but also serve as a friction device for being provided in front of a reel base of an auto-reverse mechanism.

As apparent from the description, according to the present invention, a flange formed in a driven member to which a magnet for detecting rotation of the driven member has conventionally been secured can be omitted, and, such a magnet is mounted on the driven rotatable shaft itself. Therefore, the thickness of the whole apparatus can be largely minimized. Additionally, a spring which has been required in the conventional apparatus is not also required, thus to diminish the number of parts, resulting in lowering its production cost.

I claim:

1. A force transmitting apparatus for use in a magnetic recording/reproducing apparatus, which comprises: a rotatable reel shaft provided in the magnetic recording/reproducing apparatus, said reel shaft having a reel-driving hub mounted on one end thereof; an annular driving pulley coaxially mounted on said reel shaft for rotation with respect thereto, said driving pulley having a coaxial, annular, flat, axial end face facing toward said one end of said reel shaft; a coaxial, annular, magnetically attractable, flat disc affixed to said axial end face of said driving pulley for rotation therewith; a coaxial, annular, flat magnet affixed to said reel shaft and located between said reel-driving hub and said pulley, said magnet being disposed in coaxial, opposed relationship to said disc so that said disc is attracted to said magnet whereby said driving pulley is magnetically held in driving engagement with said magnet and thereby with said reel shaft; and a detector for detecting rotation of said magnet, said detector being disposed between said reel-driving hub and said pulley at a location radially outwardly from the periphery of said magnet.

* * * * *